US012586921B2

(12) United States Patent
Kololuoma et al.

(10) Patent No.: US 12,586,921 B2
(45) Date of Patent: Mar. 24, 2026

(54) ANTENNA ARRAY, ARTIFICAL TARGET SYSTEM, METHOD AND COMPUTER PROGRAM

(71) Applicant: Teknologian tutkimuskeskus VTT Oy, Espoo (FI)

(72) Inventors: Terho Kololuoma, Espoo (FI); Arttu Huttunen, Espoo (FI); Antti Tanskanen, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 106 days.

(21) Appl. No.: 18/569,244

(22) PCT Filed: Jun. 15, 2022

(86) PCT No.: PCT/FI2022/050416
§ 371 (c)(1),
(2) Date: Dec. 12, 2023

(87) PCT Pub. No.: WO2022/263723
PCT Pub. Date: Dec. 22, 2022

(65) Prior Publication Data
US 2024/0275066 A1     Aug. 15, 2024

(30) Foreign Application Priority Data
Jun. 16, 2021     (FI) ...................................... 20215707

(51) Int. Cl.
*H01Q 15/14*          (2006.01)
*F41H 3/00*          (2006.01)
(Continued)

(52) U.S. Cl.
CPC ............. *H01Q 15/148* (2013.01); *F41H 3/00* (2013.01); *F41J 2/00* (2013.01); *G01S 7/38* (2013.01);
(Continued)

(58) Field of Classification Search
CPC .. H01Q 3/24–247; H01Q 3/44; H01Q 15/148; H01Q 17/00–008; H01Q 21/061;
(Continued)

(56) References Cited

U.S. PATENT DOCUMENTS 4,684,952 A  *  8/1987  Munson ............... H01Q 21/065
                                                    342/368
6,535,162 B1 *  3/2003  Butler ................... G01S 7/4056
                                                    342/174
(Continued)

FOREIGN PATENT DOCUMENTS

CN          110311738 A     10/2019
WO     WO-2010136461 A1 * 12/2010   ........... G01S 13/767
WO     WO-2022077185 A1 *  4/2022   ............. H01Q 1/246

OTHER PUBLICATIONS

Hansen: Relationships Between Antennas as Scatterers and as Radiators. Proceedings of the IEEE, May 1, 1989, vol. 77, No. 5, pp. 659-662.

(Continued)

*Primary Examiner* — AB Salam Alkassim, Jr.
(74) *Attorney, Agent, or Firm* — Laine IP Oy

(57) ABSTRACT

According to an example aspect of the present invention, there is provided an antenna array arranged to control a radar response of a target, comprising multiple ultra wideband antennas, wherein each of said multiple antennas is coupled to a separate switch, and each switch is arranged to control one of said multiple antennas such that when said one antenna is connected to a load, preferably matched load, said one antenna acts as an absorber, and when said one antenna is electrically shorted, said one antenna acts as a reflector, wherein at least one of said multiple antennas is arranged to be electrically shorted at a first time instant and the at least one of said multiple antennas is arranged to be connected to a load, preferably matched load, at a second time instant, and (Continued)

at least one other of said multiple antennas is arranged to be connected to a load, preferably matched load, at the first time instant and the at least one other of said multiple antennas is arranged to be electrically shorted at the second time instant.

17 Claims, 6 Drawing Sheets

(51) Int. Cl.

| | | |
|---|---|---|
| *F41J 2/00* | (2006.01) | |
| *G01S 7/38* | (2006.01) | |
| *H01Q 3/24* | (2006.01) | |
| *H01Q 3/44* | (2006.01) | |
| *H01Q 21/06* | (2006.01) | |
| *H01Q 21/28* | (2006.01) | |

(52) U.S. Cl.
CPC .............. *H01Q 3/247* (2013.01); *H01Q 3/44* (2013.01); *H01Q 21/061* (2013.01); *H01Q 21/28* (2013.01)

(58) Field of Classification Search
CPC .... H01Q 21/28; F41J 2/00; F41H 3/00; G01S 7/28
See application file for complete search history.

(56) References Cited

U.S. PATENT DOCUMENTS

| | | | | |
|---|---|---|---|---|
| 10,426,021 | B2 * | 9/2019 | Caspari ................ | H05H 1/0012 |
| 11,894,613 | B1 * | 2/2024 | Khushrushahi ...... | H01Q 17/007 |
| 12,230,130 | B2 * | 2/2025 | Chavoshi ................. | G08G 1/08 |
| 2004/0201526 | A1 * | 10/2004 | Knowles ................ | H01Q 17/00 |
| | | | | 343/700 MS |
| 2004/0263420 | A1 * | 12/2004 | Werner .................... | H01Q 1/38 |
| | | | | 343/909 |
| 2006/0145853 | A1 * | 7/2006 | Richards ............ | G06K 7/10306 |
| | | | | 340/572.1 |
| 2008/0224947 | A1 * | 9/2008 | Werner ................ | H01Q 15/002 |
| | | | | 343/911 R |
| 2009/0027267 | A1 * | 1/2009 | Carter ................ | H01Q 15/0066 |
| | | | | 342/372 |
| 2012/0268308 | A1 * | 10/2012 | Tuttle .................... | G01S 13/582 |
| | | | | 342/104 |
| 2016/0033632 | A1 | 2/2016 | Searcy et al. | |
| 2017/0047663 | A1 * | 2/2017 | Hall ......................... | G01S 7/38 |
| 2018/0026363 | A1 | 1/2018 | Bevelacqua | |
| 2018/0123229 | A1 | 5/2018 | Stratis et al. | |
| 2018/0275246 | A1 * | 9/2018 | Ma ......................... | G01S 13/765 |
| 2020/0124719 | A1 * | 4/2020 | Noujeim ............. | G05D 1/0088 |
| 2021/0223752 | A1 * | 7/2021 | Degani ................. | G01S 7/4086 |
| 2023/0118396 | A1 * | 4/2023 | Kossin .................... | H01Q 3/34 |
| | | | | 342/374 |
| 2025/0096458 | A1 * | 3/2025 | Salehi-Abari ............ | H01Q 3/22 |

OTHER PUBLICATIONS

Lorenzo et al: Modulated Frequency Selective Surfaces for Wearable RFID and Sensor Applications. IEEE Transactions on Antennas and Propagation, IEEE, Oct. 1, 2016, vol. 64, No. 10, pp. 4447-4456.

* cited by examiner

30

35

30

35

30

35a

35b

30

35a

35b

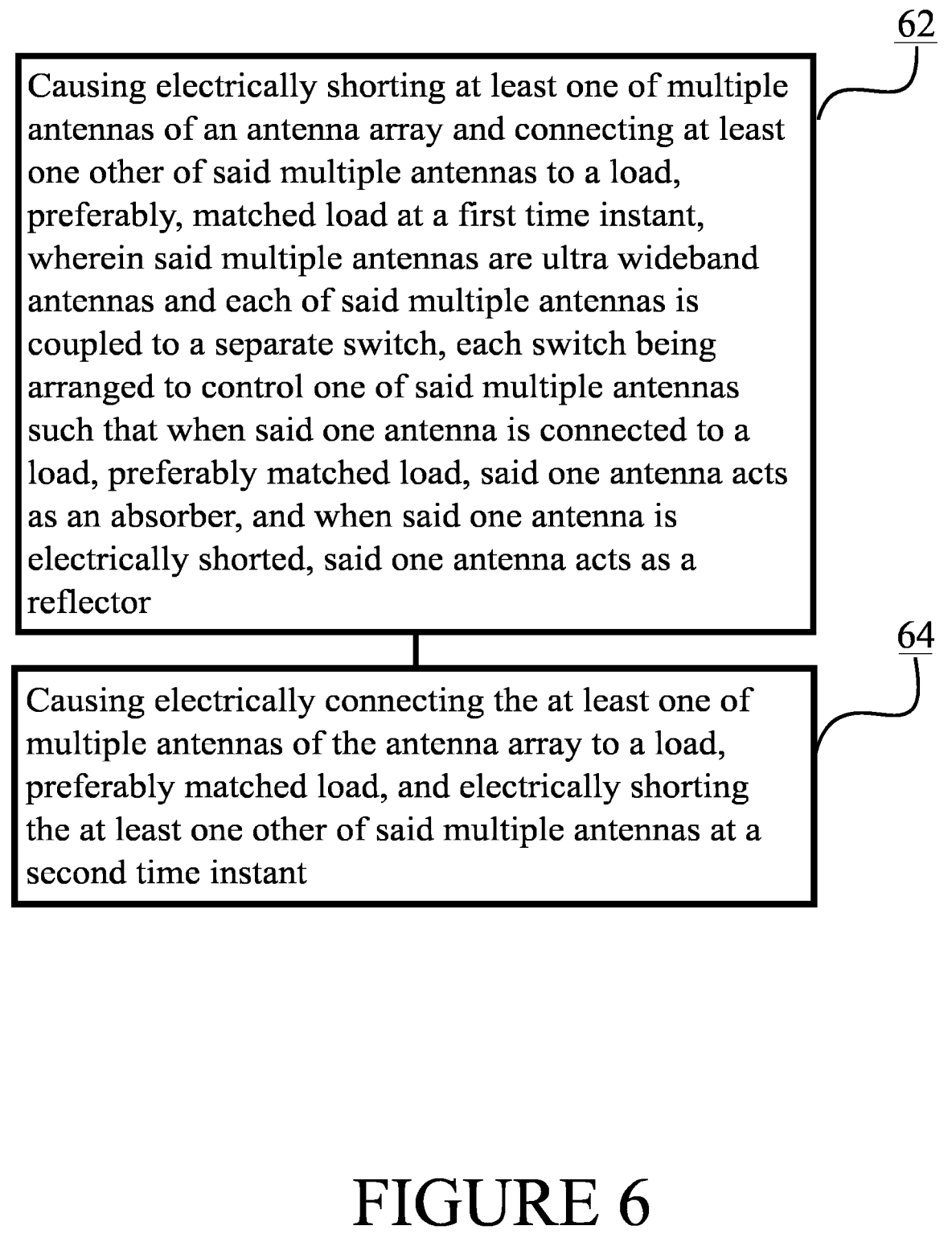

62

Causing electrically shorting at least one of multiple antennas of an antenna array and connecting at least one other of said multiple antennas to a load, preferably, matched load at a first time instant, wherein said multiple antennas are ultra wideband antennas and each of said multiple antennas is coupled to a separate switch, each switch being arranged to control one of said multiple antennas such that when said one antenna is connected to a load, preferably matched load, said one antenna acts as an absorber, and when said one antenna is electrically shorted, said one antenna acts as a reflector

64

Causing electrically connecting the at least one of multiple antennas of the antenna array to a load, preferably matched load, and electrically shorting the at least one other of said multiple antennas at a second time instant

FIGURE 6

ANTENNA ARRAY, ARTIFICAL TARGET SYSTEM, METHOD AND COMPUTER PROGRAM

FIELD

Embodiments of the present invention relate in general to artificial target systems and more specifically to controlling a radar response of a target.

BACKGROUND

Radars may be used for detecting, supervising, and/or imaging various targets, as well as intelligence gathering, by exploiting characteristics of radio waves. For example, a distance or direction to a target may be estimated using radars. In addition, radars may be utilized for estimating the speed of a target. Radars typically use radio waves at frequencies ranging from 30 Hz to 50 GHz. Thus, radars are capable of sensing in all environmental conditions, such as, in direct sunlight, darkness, smoke, rain or dust.

Artificial target systems of various sorts may be used for example in military operations offering ability to create decoys with authentic spectral response, in training as well as in hunting and shooting practice to mimic a particular target. Other applications comprise avoidance systems increasing the radar visibility of a target, which may be exploited at least in drones, self driving cars, boats and vessels.

Such artificial target system may manipulate a radar response of a target. The target may be coated with materials having a controllable electrical conductivity at radar frequencies or with metamaterials having some structural attributes capable to quench signal of a radar. However, such materials may be expensive and unstable. In addition, the radar response of the radar should be controllable, e.g., locally, and it should be possible to change the radar response of the target during the operation. There is therefore a need to provide improvements for artificial target systems.

SUMMARY OF THE INVENTION

According to some aspects, there is provided the subject-matter of the independent claims. Some embodiments are defined in the dependent claims.

According to a first aspect of the present invention, there is provided an antenna array arranged to control a radar response of a target, comprising multiple ultra wideband antennas, wherein each of said multiple antennas is coupled to a separate switch, and each switch is arranged to control one of said multiple antennas such that when said one antenna is connected to a load, preferably a matched load, said one antenna acts as an absorber, and when said one antenna is electrically shorted, said one antenna acts as a reflector, wherein at least one of said multiple antennas is arranged to be electrically shorted at a first time instant and the at least one of said multiple antennas is arranged to be connected to a load, preferably matched load, at a second time instant, and at least one other of said multiple antennas is arranged to be connected to a load, preferably matched load, at the first time instant and the at least one other of said multiple antennas is arranged to be electrically shorted at the second time instant.

According to a second aspect of the present invention, there is provided an artificial target system, comprising the antenna array and a controlling apparatus, the controlling apparatus comprising at least one processing core and at least one memory including computer program code, wherein the at least one memory and the computer program code are configured to, with the at least one processing core, cause the controlling apparatus to control the antenna array.

According to a third aspect of the present invention, there is provided a method, comprising causing shorting at least one of multiple antennas of an antenna array to matched load and connecting at least one other of said multiple antennas to matched load at a first time instant, wherein said multiple antennas are ultra wideband antennas and each of said multiple antennas is coupled to a separate switch, each switch being arranged to control one of said multiple antennas such that when said one antenna is connected to matched load, said one antenna acts as an absorber, and when said one antenna is shorted, said one antenna acts as a reflector and causing connecting the at least one of multiple antennas of the antenna array to matched load and shorting the at least one other of said multiple antennas to matched load at a second time instant.

According to a fourth aspect of the present invention, there is provided a computer program comprising instructions which, when the program is executed by an apparatus, cause the apparatus to perform the method.

BRIEF DESCRIPTION OF THE DRAWINGS

FIG. 6 illustrates a flow graph of a method in accordance with at least some embodiments of the present invention.

EMBODIMENTS

Embodiments of the present invention enable manipulation of a radar response of a target by using an antenna array, wherein each individual antenna of the antenna array is coupled to a matched load or shorted. Each individual antenna may be coupled to a separate switch such that when an antenna is connected to matched load, said antenna acts as an absorber, and when said antenna is shorted, said antenna acts as a reflector. The radar response of the target may be manipulated actively to adapt the radar response during the operation. The antenna array may be described as a pixeled display that can be used to modify the appearance of the target at the radar. In some embodiments, the aim is not to make the target invisible to the radar but to control a radar response of the target so that the target appears as other than its natural radar fingerprint. Moreover, in some embodiments, the display can be used to create of a radar image of the non-existing device on an area under radar surveillance. In some embodiments, an individual antenna may be connected to a load, even if the load is not matched, to act as an absorber.

Embodiments of the present invention provide an antenna array for an artificial target system which is capable of manipulating signals of the radar at a wide frequency range, has a remarkable difference in the radar signal in absorptive/ reflective states and is suitable for various sizes and shapes. Also, a constant response at variety of frequencies is provided.

Figure 1:
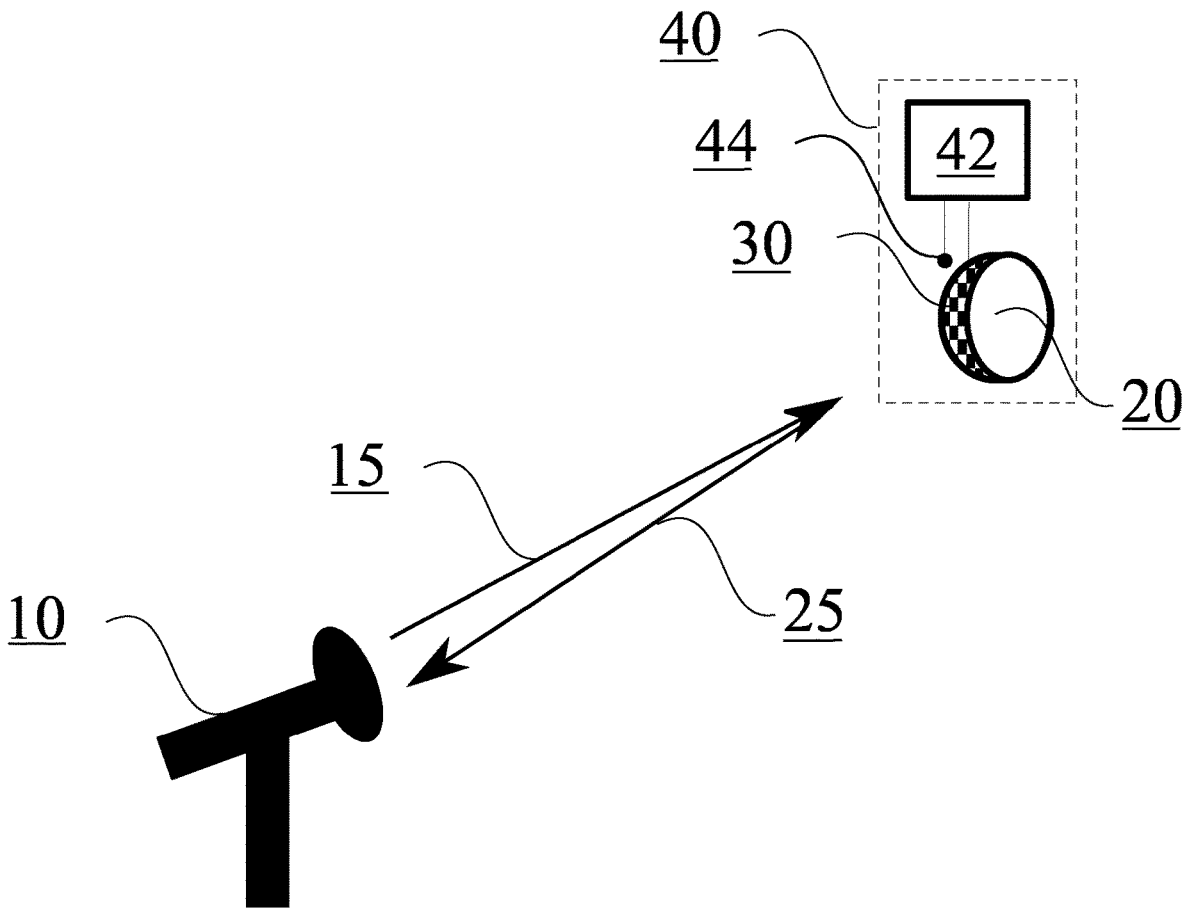
FIG. 1 illustrates operation of an example radar system in accordance with at least some embodiments of the present invention.

FIG. 1 illustrates operation of an example radar system in accordance with at least some embodiments of the present invention. The radar system of FIG. 1 may comprise radar 10, target 20 and antenna array 30 for controlling a radar response of target 20. That is, antenna array 30 may be arranged to control the radar response of target 20. Artificial target system 40 may comprise antenna array 30 and controlling apparatus 42, and possibly target 20 as well. Controlling apparatus 42 may be for controlling antenna array 30, e.g., a computer configured to control antenna array 30. Controlling apparatus 42 may be coupled to antenna array 30 via a wired or wireless interface.

In embodiments of the invention, the expression "artificial target system" includes, but is not limited to, decoy devices for imitating targets, such as military assets, and dummies for targeting practice. In some embodiments, artificial target system 40 may also comprise sensor 44, such as an optical sensor, connected to controlling apparatus 42.

Antenna array 30 may be attached, or attachable, to target 20, mechanically, or by chemically bonding. Alternatively, antenna array 30 may lay, or be arranged to be laid, on target 20, wherein target 20 may be a drapery, cloth or textile on top of and/or around target 20. Antenna array 30 may be adjustable to a shape of at least a part of target 20. For instance, if target 20 is a round ball, antenna array 30 may be flexible and adjusted along the periphery of target 20, at least partly. If target 20 is a truck, antenna array 30 may be attached to a side or a roof of the truck. Depending on the application, target 20 may be for example a car, airplane, ship or human. Naturally, target 20 may be any other target detectable by radar 10 as well and the embodiments of the present invention are not limited to any specific target 20. In some embodiments, target 20 may be two- or three-dimensional and antenna array 30 may be arranged to provide a two-dimensional radar response of target 20. In some embodiments, antenna array 30 may be target 20 itself, i.e., a self-standing system.

In some embodiments, antenna array 30 may be arranged as a planar sheet to produce the radar response of target 20. In such a case, target 20 may be a two- or three-dimensional object and even though antenna array 30 is a two-dimensional planar sheet, antenna array may be arranged to produce the radar response of target 20. As a planar sheet, antenna array 30 may produce amplitude difference.

In general it would be desirable to provide a solution which does not need to be physically modified for each application so that one solution may be used for various applications, at least to reduce manufacturing costs. Thus, one challenge addressed by embodiments of the invention is how to reduce manufacturing costs of artificial target systems.

Embodiments of the present invention therefore provide an antenna array which would be suitable for various applications, like military, practice and avoidance systems. Antenna array 30 may comprise multiple antennas, such as Ultra Wideband, UWB, antennas. UWB antennas may be used to enable various applications, which is particularly beneficial if the radar response of target 20 can be changed and controlled because various applications can be supported by providing different radar responses, depending on the situation. Antenna array 30 may be applied against radars operating on different frequencies, such as radars operating on frequencies 2-18 GHz, and it is possible to control absorption and reflection over the entire bandwidth with the same antenna array even if radars would be used for different applications.

In general, an antenna array comprising multiple antennas in a horizontal or a vertical direction may be referred to as a 1-dimensional antenna array and an antenna array comprising multiple antennas in both, horizontal and vertical, directions may be referred to as a 2-dimensional antenna array. Said multiple antennas may be circular monopole antennas, to enable easy manufacturing. Alternatively, said multiple antennas may be any 2-dimensional projection of a 3-dimensional antenna retaining the wideband characteristics of the original antenna, such as but not limited to planar projection of a conical antenna, planar projection of a discone antenna, planar projection of a circular, semi-circular or elliptical dipole or monopole.

During operation, radar 10 may transmit at least one electromagnetic signal 15 over air interface. At least one electromagnetic signal 15 transmitted by radar 10 may hit target 20 and thus get reflected back to radar 10. At least one reflected electromagnetic signal 25 of at least one electromagnetic signal 15 may be hence referred to as an echo signal as well.

Antenna array 30 may be arranged to manipulate a radar response of target 20. The radar response of target 20 may be manipulated by using antenna matrix 30 comprising antennas that are coupled to a load or a short circuit. That is, each individual antenna of antenna matrix may be coupled either to the load or the short circuit. Each antenna may hence form a "pixel" that may be controlled to either absorb or reflect Radio Frequency, RF, energy, captured from at least one electromagnetic signal 15 transmitted by radar 10. A shorted antenna may act as a reflector with Radar Cross Section, RCS, somewhat larger than the equivalent antenna aperture. Matched element may have lower RCS compared to the reflector case by effective antenna aperture. Antenna array 30, and a radar response of target 20, may be locally controlled by controlling apparatus 42. Antennas of antenna array 30 may be either connected to matched load or shorted at a time, but not both.

In some embodiments, a non-resonant wide band or UWB antennas may be exploited, to manipulate the radar response of target 20 consistently in a range of frequencies, for example from 2 to 18 GHz. That is, each antenna of antenna array 30 may be configured to operate on a frequency range from about 2 to about 18 GHz. The frequency range may thus refer to a frequency range on which each antenna of antenna array 30 may absorb and reflect signals transmitted by radar 10. With a single antenna, 8 dB difference in reflective signal strength may be achieved between the reflective and absorptive states. This corresponds to 6:1 ratio in effective RCS.

Controlling apparatus 42 may transmit to antenna array 30 control information about whether a certain antenna of antenna array 30 should be shorted or connected to matched load. Antenna array 30 may comprise, or be associated with, a receiver, to receive said control information from controlling apparatus 42. Antenna array 30 may comprise switches and each switch may be arranged to control one of said multiple antennas such that when said one antenna is connected to matched load, said one antenna acts as an absorber, and when said one antenna is shorted, said one antenna acts as a reflector. Controlling apparatus 42 may thus control each switch by transmitting said control information to antenna array 30.

In some embodiments, controlling apparatus 42 may control antenna array 30 based on an output of sensor 44. Sensor 44 may be an optical sensor, such as a three-dimensional, 3D, sensor. For instance, sensor 44 may be a Lidar. Sensor 44 may for example detect the presence of radar 10, or a vehicle comprising radar 10, and transmit information about said detection to controlling apparatus 42. Controlling apparatus may then change the radar response of target 20. In case of training, sensor 44 may detect that the training scenario has changed and inform controlling apparatus 42 about the change, so that controlling apparatus may change the radar response of target 20 accordingly. In some embodiments, sensor 44 may identify target 20 as an enemy and controlling apparatus 42 may then change the radar response of target 20 accordingly, e.g., to provide a different radar response to enemies and allies.

Alternatively, or in addition, sensor 44 may recognize a type of a vehicle comprising radar 10. Sensor 44 may for example recognize that the type of the vehicle is an airplane or a car and controlling apparatus 42 may then change the radar response of target 20 accordingly. For instance, different radar response may be provided if the vehicle is recognized as an autonomous car, to ensure that target 20 is detected by radar 10 properly. By autonomous car, it is herein meant a car that is at least in part autonomously driving, or one which provides driving advice to a human driver concerning, for example, targets ahead. Sensor 44 therefore enables and is useful for various applications.

Figure 2A:
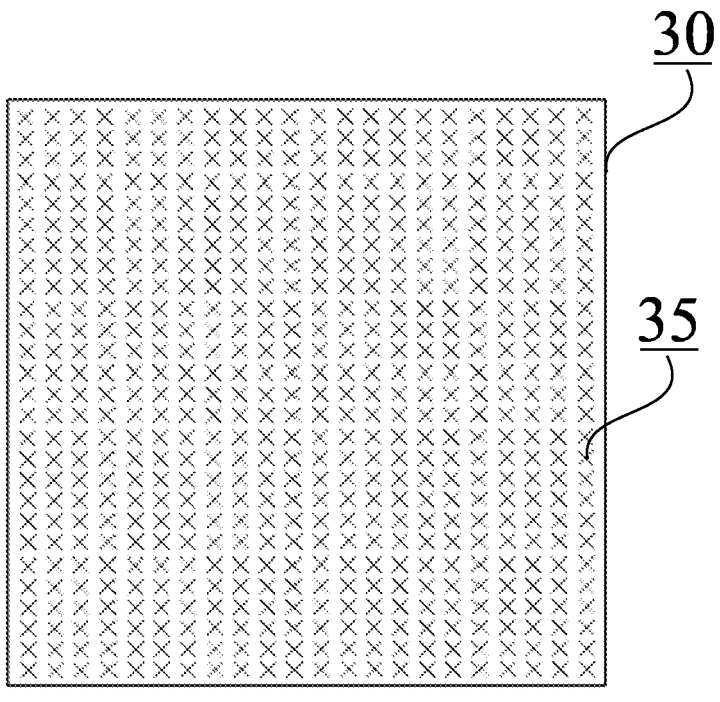
FIG. 2A illustrates an antenna array when all antennas are connected to a matched load in accordance with at least some embodiments of the present invention.
Figure 2B:
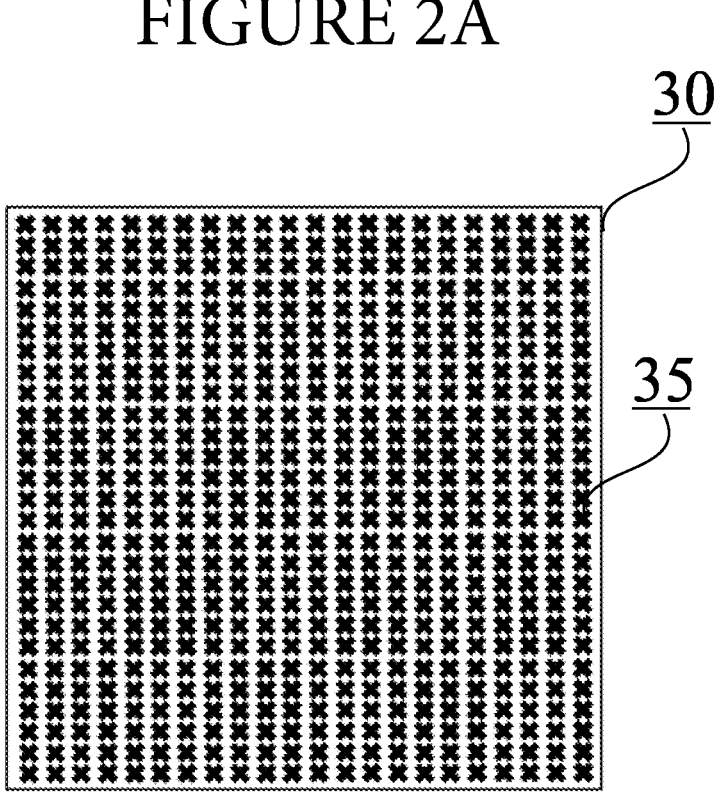
FIG. 2B illustrates an antenna array when all antennas are shorted in accordance with at least some embodiments of the present invention.

FIG. 2A illustrates antenna array 30 when all antennas 35 are connected to a matched load in accordance with at least some embodiments of the present invention. FIG. 2B illustrates antenna array 30 when all antennas 35 are shorted in accordance with at least some embodiments of the present invention.

Figure 3A:
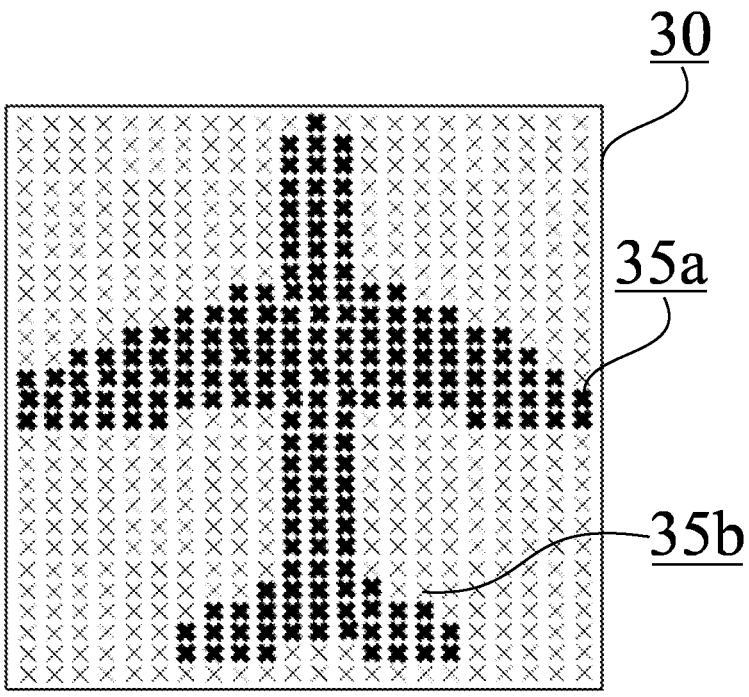
FIG. 3A illustrates an example of a radar response at a first time instant in accordance with at least some embodiments of the present invention.
Figure 3B:
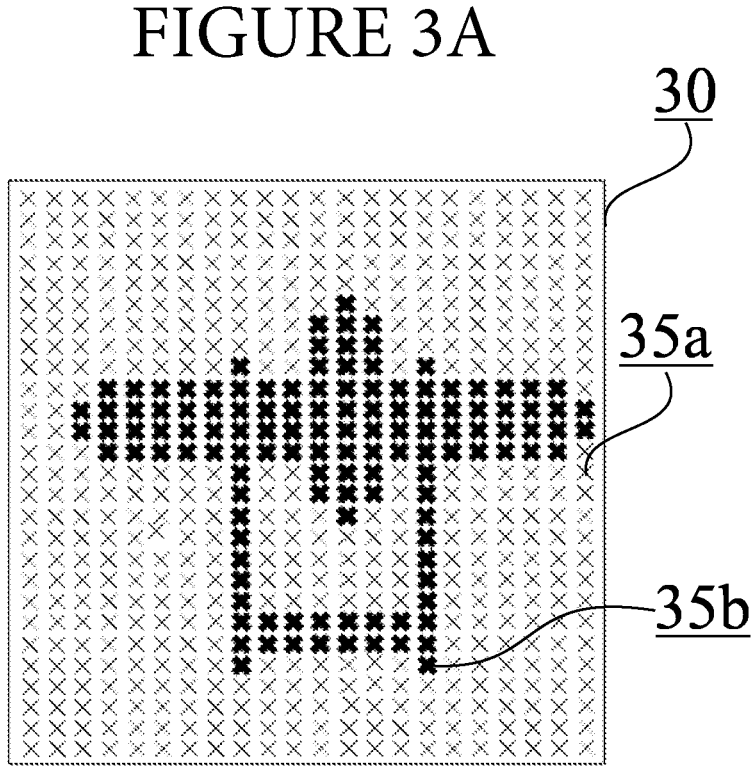
FIG. 3B illustrates an example of a radar response at a second time instant in accordance with at least some embodiments of the present invention.

FIGS. 3A and 3B illustrate radar responses when some antennas are connected to a matched resistor and some antennas are shorted. The radar responses may be Synthetic Aperture Radar, SAR, images for example. FIG. 3A illustrates an example of a radar response at a first time instant in accordance with at least some embodiments of the present invention. FIG. 3B illustrates an example of a radar response at a second time instant in accordance with at least some embodiments of the present invention. At least one of said multiple antennas 35a may be shorted at a first time instant and connected to matched load at a second time instant. At least one other of said multiple antennas 35b may be connected to matched load at the first time instant and shorted at the second time instant. Hence, different radar responses may be provided. For instance, at the first time instant a radar response may be provided for a first radar, possibly operating on a first frequency, and at the second time instant for a second radar, possibly operating on a second frequency. In addition, or alternatively, at the first time instant a radar response may be provided for a first application and at the second time instant for a second application. Thus, antenna array 30 is suitable for various application and manufacturing costs of artificial target systems can be reduced using only one antenna array 30.

More specifically, FIGS. 3A and 3B illustrate a strength of a relative radar signal returning from each antenna 35 such that shorted antennas provide a radar response signal with a higher power compared to antennas which are matched to load. That is, at the first time instant antenna 35a returns a radar response signal with a higher power such that the radar response signal of antenna 35a is visible to radar 10. However, at the second time instant antenna 35a returns a radar response signal with a lower power, if any, such that the radar response signal of multiple antennas 35a is not visible to radar 10.

Figure 4A:
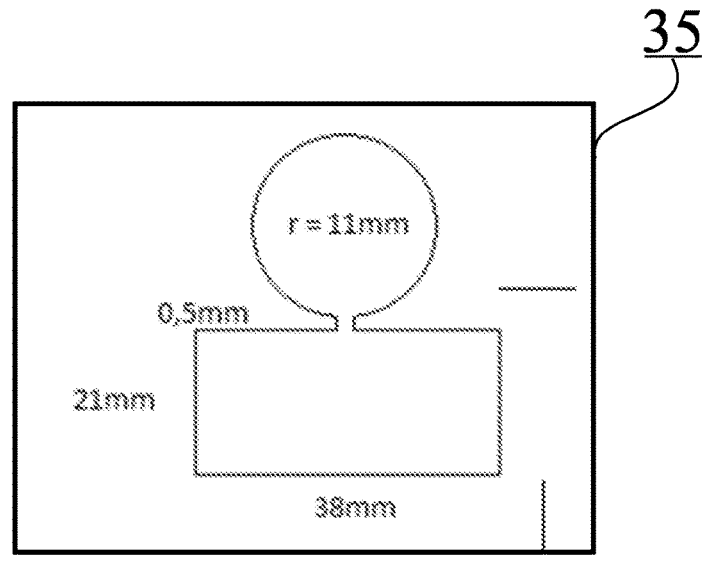
FIG. 4A illustrates a Ultra Wideband, UWB, antenna chaff in accordance with at least some embodiments of the present invention.

FIG. 4A illustrates an UWB antenna chaff in accordance with at least some embodiments of the present invention. Wide range of frequencies may be achieved by a circular monopole antenna for example, but other UWB antenna types may also be used.

Figure 4B:
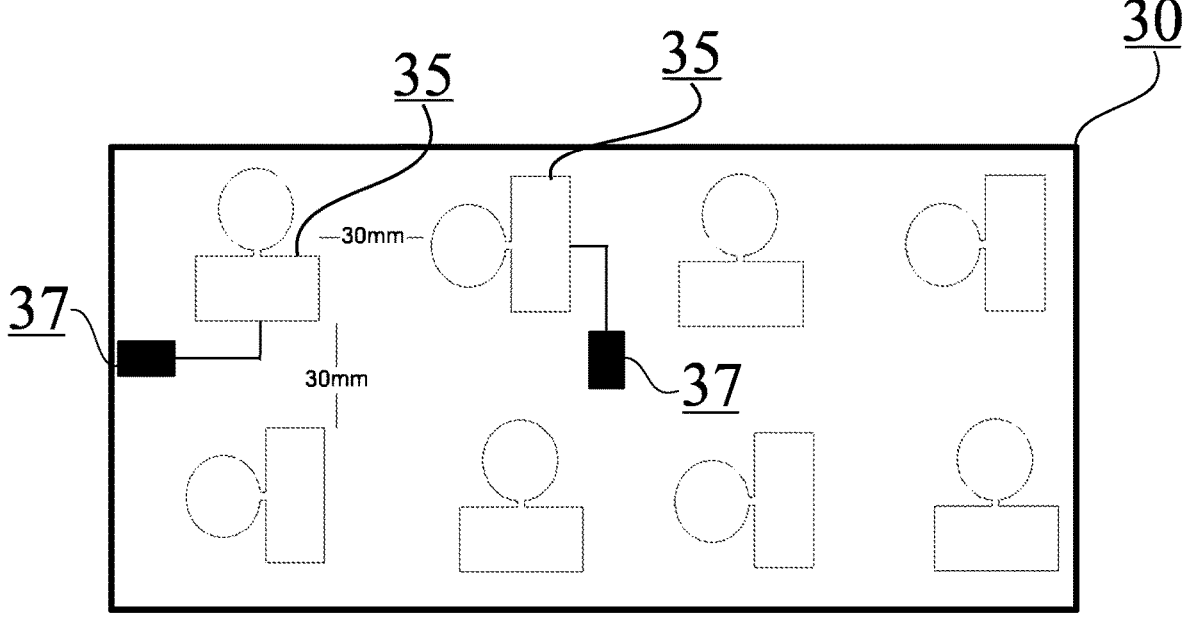
FIG. 4B illustrates a 4*2 antenna array in accordance with at least some embodiments of the present invention.

FIG. 4B illustrates a 4*2 antenna array in accordance with at least some embodiments of the present invention. FIG. 4B also shows switches 37. Each switch 37 may be connected to separate antenna 35a, 35b. Each switch 37 may be further connected to controlling apparatus 42, possible via the receiver of antenna array 30. As shown in FIG. 4B, antenna array 30 may comprise switches 37. In general though, artificial target system 40 may comprise switches 37, i.e., switches 37 do not need to be in antenna array 30 but each switch 37 needs to be coupled to one, separate antenna 35. Antenna array 30 may be formed as polarization independent by rotating every second antenna 35 by 90 degrees with respect to an adjacent antenna, as shown in FIG. 4B.

Each switch 37 may be mechanically, electromechanically or electrically controlled. Examples of electromechanically controlled switch 37 comprise at least a toggle switch, a rotary switch, mercury switch push-button switch, reversing switch or a relay. Examples of electrically controlled switch 37 comprise at least a discrete and stacked up transistor or a transistor manufactured using techniques of printed electronics. Switch 37 may be for example a relay, a PIN diode, a regular diode biased forward or reverse, a capacitance diode adjusted to extreme capacitances or an inductive element adjusted in the same way, photo resistive or a photo electric element controlled by light. Switch 37 may be a transistor or a FET.

Figure 5:
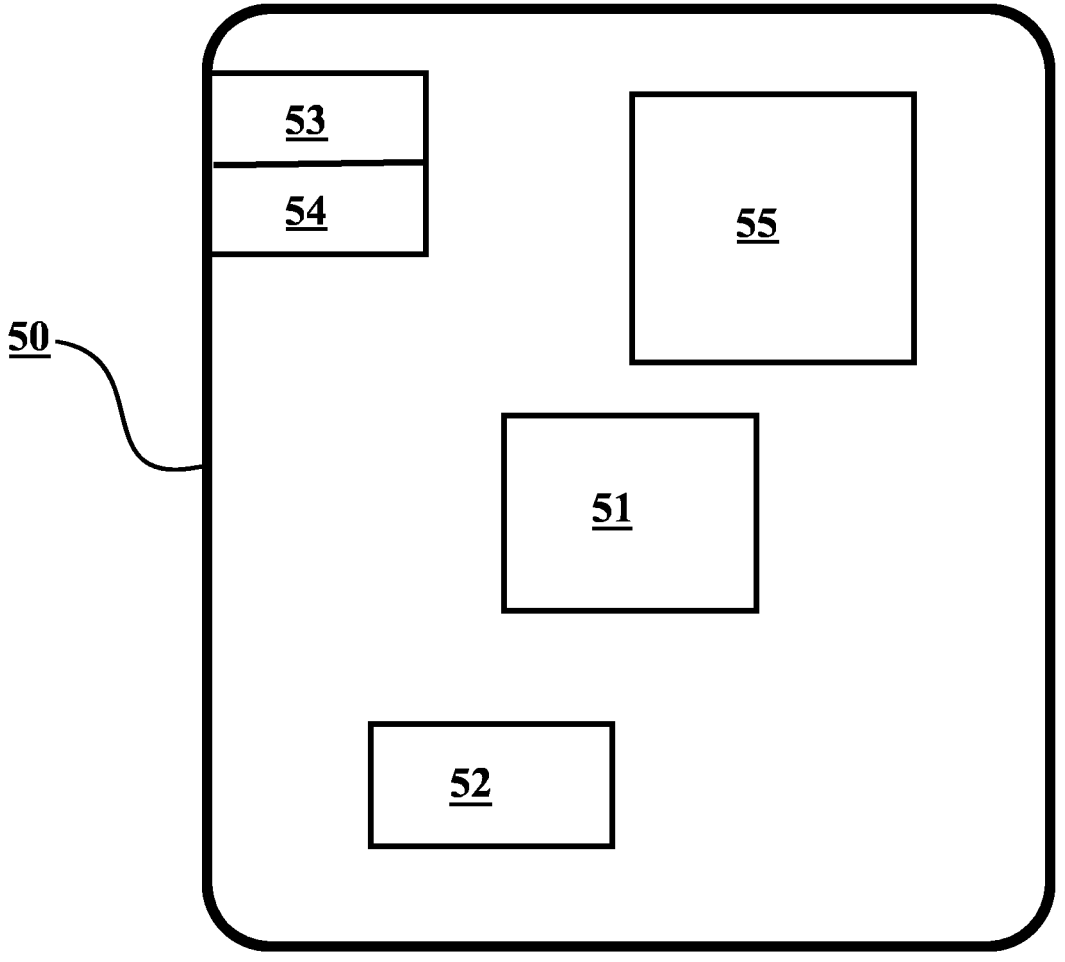
FIG. 5 illustrates an example apparatus capable of supporting at least some embodiments of the present invention.

FIG. 5 illustrates an example apparatus capable of supporting at least some embodiments of the present invention. Illustrated is apparatus 50, which may comprise or correspond to controlling apparatus 42 of FIG. 1. That is to say, apparatus 50 may also be a control device configured to control the functioning of antenna array 30.

Comprised in apparatus 50 may be processing unit, i.e., processing element, 51, which may further comprise, for example, a single- or multi-core processor wherein a single-core processor comprises one processing core and a multi-core processor comprises more than one processing core. Processing unit 51 may comprise, in general, a control device. Processing unit 51 may comprise one or more processors. Processing unit 51 may be a control device. Processing unit 51 may comprise at least one Application-Specific Integrated Circuit, ASIC. Processing unit 51 may comprise at least one Field-Programmable Gate Array, FPGA. Processing unit 51 may be means for performing method steps in apparatus 50. Processing unit 51 may be configured, at least in part by computer instructions, to perform actions.

Apparatus 50 may comprise memory 52. Memory 52 may comprise Random-Access Memory, RAM, and/or permanent memory. Memory 52 may comprise at least one RAM chip. Memory 52 may comprise solid-state, magnetic, optical and/or holographic memory, for example. Memory 52 may be at least in part accessible to processing unit 51. Memory 52 may be at least in part comprised in processing unit 51. Memory 52 may be means for storing information, such as a phase and amplitude of a reflected signal. Memory 52 may comprise computer instructions that processing unit 51 is configured to execute. When computer instructions configured to cause processing unit 51 to perform certain actions are stored in memory 52, and apparatus 50 overall is configured to run under the direction of processing unit 51 using computer instructions from memory 52, processing unit 51 and/or its at least one processing core may be considered to be configured to perform said certain actions. Memory 52 may be at least in part comprised in processing unit 51. Memory 52 may be at least in part external to apparatus 50 but accessible to apparatus 50.

Apparatus 50 may comprise a transmitter 53. The transmitter 53 may comprise at least one transmit antenna, or the transmitter 53 may be connectable to the at least one transmit antenna. Apparatus 50 may also comprise a receiver 54. The receiver may comprise at least one receive antenna, or the receiver may be connectable to the at least one receive antennas, forming at least two receive channels correspondingly.

Apparatus 50 may also comprise a user interface, UI, 55. UI 55 may comprise at least a display or a touchscreen. A user may be able to operate apparatus 50 via UI 55. Also, UI 55 may be used for displaying information to the user. For example, UI 55 may be used for providing, i.e., displaying, a magnitude and/or angle image of radar 10.

Processing unit 51 may be furnished with a transmitter arranged to output information from processing unit 51, via electrical leads internal to apparatus 50, to other devices comprised in apparatus 50. Such a transmitter may comprise a serial bus transmitter arranged to, for example, output information via at least one electrical lead to memory 52 for storage therein. Alternatively to a serial bus, the transmitter may comprise a parallel bus transmitter. Likewise processing unit 51 may comprise a receiver arranged to receive information in processing unit 51, via electrical leads internal to apparatus 50, from other devices comprised in apparatus 50. Such a receiver may comprise a serial bus receiver arranged to, for example, receive information via at least one electrical lead from receiver 54 for processing in processing unit 51. Alternatively to a serial bus, the receiver may comprise a parallel bus receiver.

Processing unit 51, memory 52, transmitter 53, receiver 54 and/or UI 55 may be interconnected by electrical leads internal to apparatus 50 in a multitude of different ways. For example, each of the aforementioned devices may be separately connected to a master bus internal to apparatus 50, to allow for the devices to exchange information. However, as the skilled person will appreciate, this is only one example and depending on the embodiment various ways of interconnecting at least two of the aforementioned devices may be selected without departing from the scope of the present invention.

FIG. 6 is a flow graph of a method in accordance with at least some embodiments of the present invention. The phases of the illustrated method may be performed by artificial target system 40 in general, or more specifically, by controlling apparatus 42. The method may be for controlling a radar response of a target.

The method may comprise, at step 62, causing electrically shorting at least one of multiple antennas of an antenna array and connecting at least one other of said multiple antennas to a load, preferably matched load, at a first time instant, wherein said multiple antennas are ultra wideband antennas and each of said multiple antennas is coupled to a separate switch, each switch being arranged to control one of said multiple antennas such that when said one antenna is connected to a load, preferably matched load, said one antenna acts as an absorber, and when said one antenna is electrically shorted, said one antenna acts as a reflector. The method may also comprise, at step 64, causing connecting the at least one of multiple antennas of the antenna array to a load, preferably matched load, and electrically shorting the at least one other of said multiple antennas at a second time instant.

In some embodiments, the method may further comprise causing connecting and shorting by transmitting control information to the antenna array. Said control information may indicate whether each switch should be ON or OFF, to couple the respective antenna to matched load or to short the respective antenna. Alternatively, or in addition, the method may comprise receiving an output from a sensor and controlling the antenna array based on the output of the sensor.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

In an embodiment, an apparatus, such as, for example, controlling apparatus 42, may comprise means for carrying out at least some of the embodiments described above and any combination thereof.

In an embodiment, a computer program may comprise instructions which, when the program is executed by an apparatus, cause the apparatus to carry out in accordance with the embodiments described above and any combination thereof. In an embodiment, a computer program product, embodied on a non-transitory computer readable medium, may be configured to control a processing unit to perform a process comprising at least some of the embodiments described above and any combination thereof.

In an embodiment, an apparatus, such as, for example, controlling apparatus 42, may comprise at least one processing unit, and at least one memory including computer program code, wherein the at least one memory and the computer program code are configured to, with the at least one processing unit, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in radar systems.

| ACRONYMS LIST | |
| --- | --- |
| ASIC | Application-Specific Integrated Circuit |
| FPGA | Field-Programmable Gate Array |
| RAM | Random-Access Memory |
| RCS | Radar Cross Section |
| SAR | Synthetic Aperture Radar |
| UI | User Interface |
| UWB | Ultra Wideband |

| REFERENCE SIGNS LIST | |
| --- | --- |
| 10 | Radar |
| 15 | Transmitted signal |
| 20 | Target |
| 25 | Reflected signal |
| 30 | Antenna array |
| 35 | Antenna |
| 35a | Shorted antenna (reflector) |
| 35b | Antenna connected to matched load (absorber) |
| 37 | Switch |
| 40 | Artificial target system |
| 42 | Controlling apparatus |

-continued

| REFERENCE SIGNS LIST | |
| --- | --- |
| 44 | Sensor |
| 50-55 | Structure of the apparatus of FIG. 5 |
| 62, 64 | Steps in FIG. 6 |

The invention claimed is:

1. An antenna array arranged to control a radar response of a target, comprising:

multiple ultra wideband antennas, wherein each of said multiple antennas is coupled to a separate switch, and each switch is arranged to control one of said multiple antennas such that when said one antenna is connected to a load, said one antenna acts as an absorber, and when said one antenna is electrically shorted, said one antenna acts as a reflector, wherein each switch is arranged to enable use in various applications, wherein at least one of said multiple antennas is arranged to be electrically shorted at a first time instant and the at least one of said multiple antennas is arranged to be connected to a load at a second time instant, and at least one other of said multiple antennas is arranged to be connected to a load at the first time instant and the at least one other of said multiple antennas is arranged to be electrically shorted at the second time instant, and wherein the antenna array is arranged to provide a first radar response operating on a first frequency at the first time instant and a second radar response operating on a second frequency at the second time instant, the first radar response and the second radar response being different, and the first frequency and second frequency being different.

2. The antenna array according to claim 1, wherein a radar cross section of said one antenna is smaller than an antenna aperture of said one antenna when said one antenna is connected to the load.

3. The antenna array according to claim 1, wherein a radar cross section of said one antenna is larger than an antenna aperture of said one antenna when said one antenna is shorted.

4. The antenna array according to claim 1, wherein the antenna array is arranged to manipulate the radar response of the target by reflecting and/or absorbing electromagnetic signals captured from a radar differently at different times.

5. The antenna array according to claim 1, wherein each of said multiple antennas is configured to operate on a frequency range from about 2 GHz to about 18 GHz.

6. The antenna array according to claim 1, wherein the target is two- or three-dimensional and the antenna array is arranged to provide a two-dimensional radar response of the target.

7. The antenna array according to claim 1, wherein the antenna array is attachable to the target, arranged to be laid on the target or arranged as a planar sheet to produce the radar response of the target.

8. The antenna array according to claim 1, wherein the antenna array is adjustable to a shape of at least a part of the target.

9. The antenna array according to claim 1, wherein said one antenna is one of a circular monopole antenna, a planar projection of a conical antenna, planar projection of a discone antenna, planar projection of a circular, semi-circular or elliptical dipole or monopole.

10. The antenna array according to claim 1, wherein the load is a matched load.

11. An artificial target system, comprising the antenna array according to claim 1 and a controlling apparatus, the controlling apparatus comprising at least one processing core and at least one memory including computer program code, wherein the at least one memory and the computer program code are configured to, with the at least one processing core, cause the controlling apparatus to control the antenna array.

12. The artificial target system according to claim 11, further comprising a sensor, wherein the at least one memory and the computer program code are further configured to, with the at least one processing core, cause the controlling apparatus to control the antenna array based on an output of the sensor.

13. The artificial target system according to claim 11, wherein the antenna array further comprises a receiver configured to receive control information from the controlling apparatus, wherein the at least one memory and the computer program code are configured to, with the at least one processing core, cause each switch to control a separate antenna based on the control information.

14. A method, comprising:

causing electrically shorting at least one of multiple antennas of an antenna array and connecting at least one other of said multiple antennas to a load at a first time instant, wherein said multiple antennas are ultra wideband antennas and each of said multiple antennas is coupled to a separate switch, each switch being arranged to control one of said multiple antennas such that when said one antenna is connected to a load, said one antenna acts as an absorber, and when said one antenna is electrically shorted, said one antenna acts as a reflector, wherein each switch is arranged to enable use in various applications; and causing connecting the at least one of multiple antennas of the antenna array to a load and electrically shorting the at least one other of said multiple antennas at a second time instant, wherein the antenna array is arranged to provide a first radar response operating on a first frequency at the first time instant and a second radar response operating on a second frequency at the second time instant, the first radar response and the second radar response being different, and the first frequency and second frequency being different.

15. The method according to claim 14, wherein the load is a matched load.

16. A computer program product, embodied on a non-transitory computer readable medium, configured to control a processing unit to perform:

causing electrically shorting at least one of multiple antennas of an antenna array and connecting at least one other of said multiple antennas to a load at a first time instant, wherein said multiple antennas are ultra wideband antennas and each of said multiple antennas is coupled to a separate switch, each switch being arranged to control one of said multiple antennas such that when said one antenna is connected to a load, said one antenna acts as an absorber, and when said one antenna is electrically shorted, said one antenna acts as a reflector, wherein each switch is arranged to enable use in various applications; and causing connecting the at least one of multiple antennas of the antenna array to a load and electrically shorting the at least one other of said multiple antennas at a second time instant, wherein the antenna array is arranged to provide a first radar response operating on a first frequency at the first time instant and a second radar response operating on a second frequency at the second time instant, the first radar response and the second radar response being different, and the first frequency and second frequency being different.

17. The computer program product according to claim 16, wherein the load is a matched load.

* * * * *